United States Patent [11] 3,587,068

[72] Inventor George B. Strawbridge
Saint Paul, Minn.
[21] Appl. No. 791,353
[22] Filed Jan. 15, 1969
[45] Patented June 22, 1971
[73] Assignee Sperry Rand Corporation
New York, N.Y.

[54] TWO-WIRE MEMORY SYSTEM PROVIDING TEMPORARY STORAGE
6 Claims, 10 Drawing Figs.

[52] U.S. Cl. .... 340/174 M, 340/174 RC, 340/174 WA
[51] Int. Cl. .... G11c 5/02, G11c 11/06
[50] Field of Search .... 340/174 M, 173

[56] References Cited
UNITED STATES PATENTS
3,181,129 4/1965 Freedman .... 340/174

*Primary Examiner*—James W. Moffitt
*Attorneys*—Kenneth T. Grace, Thomas J. Nikolai and John P. Dority ABSTRACT: A two-wire memory system organized in a plurality of groups and blocks with a memory element at each intersection of orthogonally arranged sets of X drive lines and of Y drive-sense lines. The plurality of Y lines that form each group have an associated temporary storage YT line which has a temporary storage memory element associated with each intersecting X line. Memory system operation includes temporary storage in the associated temporary storage element of the information read out of the associated memory element and then subsequent restoration of the readout information back into the associated memory element.

INVENTOR
GEORGE B. STRAWBRIDGE
BY Kenneth T. Grace
ATTORNEY

TWO-WIRE MEMORY SYSTEM PROVIDING TEMPORARY STORAGE

The inventive concept includes at least two packaging arrangements; a first arrangement in which the groups of Y lines and the associated YT lines are packaged within the same memory module, and a second arrangement in which the groups of Y lines and the associated YT lines are packaged within separate permanent and temporary memory modules, respectively. In the first arrangement the permanent memory elements that are associated with the Y lines and temporary memory elements that are associated with the YT lines are preferably similar devices operating at the same memory speeds. In the second arrangement the permanent memory elements and the temporary memory elements are preferably different storage devices with the temporary storage devices being capable of memory speeds many times that of the permanent storage devices. This second arrangement permits the relatively slow readout and transfer of a block of multibit data words from the permanent memory module into the temporary memory module with a subsequent relatively high speed data transfer of the data words from the temporary memory module to the associated data processing system.

BACKGROUND OF THE INVENTION

The present invention is directed toward a memory system that forms an integral part of a data processing system, and in particular to a two-wire 2½D organized memory system. An example of such prior art memory organization is disclosed in the article "High Speed Ferrite 2½D Memory" T. J. Gilligan et al., Proceedings-Fall Joint Computer Conference, 1965, pages 1011—1021.

In conventional two-wire 2½D memory systems the memory organization is essentially planar, i.e., 2D, as in word-organized memory systems, comprising a plurality of groups of memory elements. Each memory element is located at the intersection of orthogonally arranged sets of X drive lines and of Y drive lines with a plurality of Y drive lines forming a group. The multibit memory words are arranged along the X drive lines, there being as many words along an X drive line as there are Y drive lines in each group and there being as many bits in a word as there are groups aligned along each X drive line. Further, in such two-wire memory systems one of the drive lines, either the X drive line or the Y drive line, is used as a common drive-sense line. The read operation is accomplished by the coincident coupling of half-select drive signals to the selected X and Y drive lines with readout of the information in the fully selected memory element accomplished along one of the half-selected drive lines, e.g., the Y drive line. As readout of the stored information is accomplished in one dimension, e.g. the Y dimension, the Y read current is applied earlier than the X read current. As the selected memory element will not produce a readout signal for a half-select current all noise pulses generated by the turning on of the Y read current subsides before the X read current is turned on. When the X drive current signal is coupled to the selected X drive line the fully selected memory element changes state, inducing a corresponding signal on the Y drive line which corresponding signal is representative of the informational state of the fully selected memory element. By properly timing the coupling of the Y drive signals and the X drive signals to the selected Y and X drive lines there are induced in the selected Y drive line, signals, whose amplitudes are representative of a stored "1" or of a stored "0," that provide a detectable difference signal between such two informational states. The output signal that is induced in the selected Y drive line is reflected back into the selected Y drive line selection electronics which are capable of distinguishing between the readout of a stored "1" and of a stored "0." The associated sense amplifier is then strobed at a predetermined time after initiation of the X drive signal to provide an optimum difference signal. Such a memory selection system is disclosed in the copending patent application of R. H. Moberg, Ser. No. 511,172, filed Dec. 2, 1965 now Pat. No. 3,479,656.

SUMMARY OF THE INVENTION

The present invention relates to a two-wire multibit memory word system organized in a plurality of groups and blocks by orthogonally arranged sets of X drive lines and of Y drive-sense lines. The system is organized with all like-ordered memory word bits arranged along the Y drive lines of a group and with the multibit memory words arranged along the X drive lines, there being as many words along an X drive line as there are Y drive lines in each group. The like-ordered Y drive lines of each group are functionally arranged to form a block, with there being as many blocks in the memory system as there are Y drive lines in each group, and there being as many bits in each memory word as there are groups in the memory system. Each group of Y drive lines includes an additional temporary storage YT drive line, with one temporary storage element at each intersecting X drive line for temporary storage of the information read out of the fully selected like-ordered memory element on the intersecting, fully selected X,Y drive lines.

DESCRIPTION OF THE PREFERRED EMBODIMENTS

Figure 1:
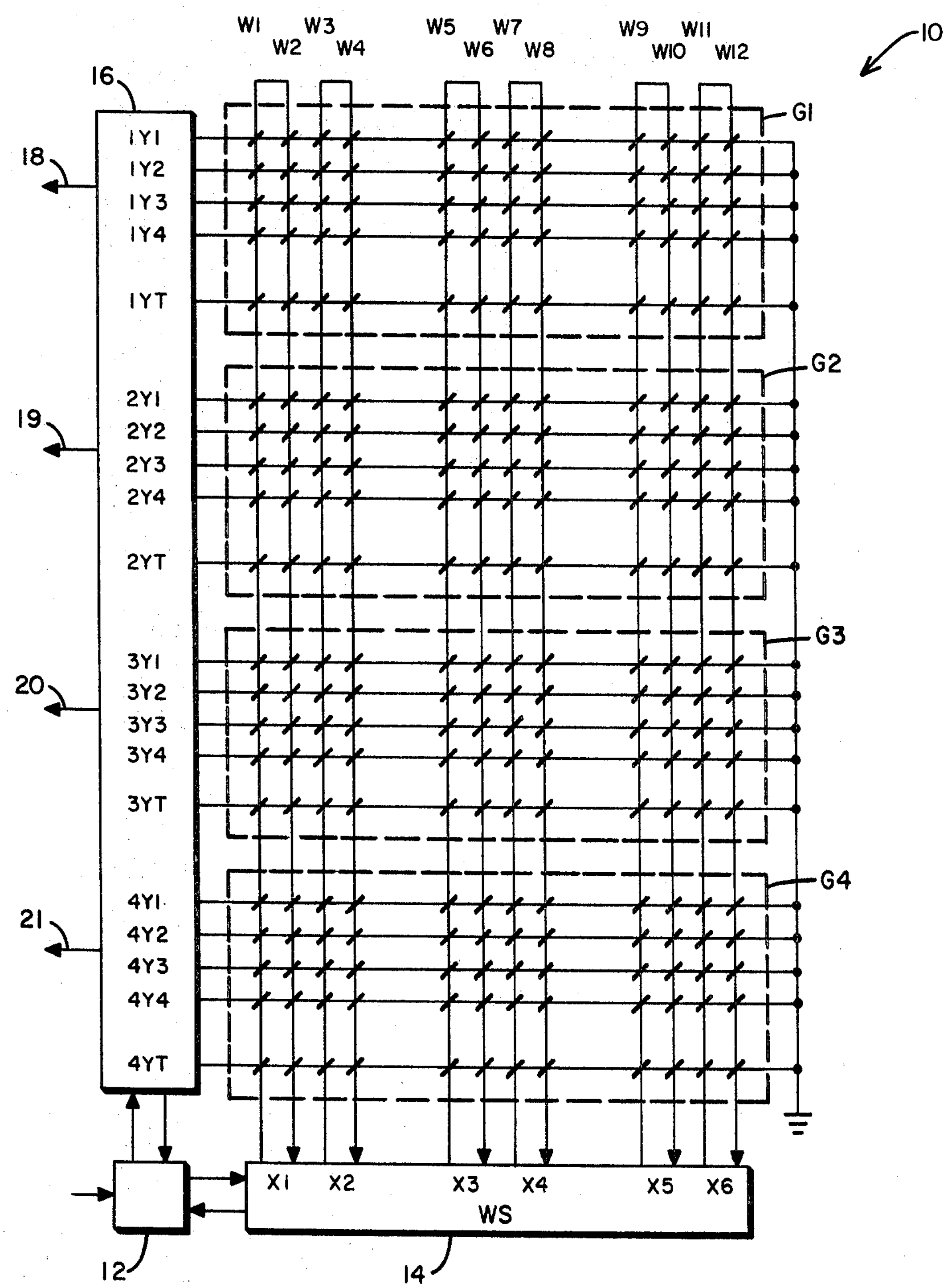
FIG. 1 is an illustration of a two-wire, 2½D organized memory system incorporating the present invention.

With particular reference to FIG. 1 there is presented an illustration of a two-wire 2½D organized memory system 10 incorporating the present invention. Memory system 10 of FIG. 1 is organized in a plurality of groups and blocks by an orthogonally arranged set of X drive lines and a set of Y drive-sense lines; each X line comprising two parallel portions running up and back, intersecting all the Y lines of the memory system 10. Each parallel half portion of each X line couples all the bits of its separately associated words, and, accordingly, each parallel half portion of each X line is identified as a separate W line, there being two intercoupled W lines for every X line. Additionally, all like-ordered bits of all like-ordered words are aligned along the like-ordered Y line within the same group. As an example, the illustrated system is formed into four groups G1, G2, G3, G4. Each group is, in turn, formed along a group of Y lines, e.g., Group 1 includes four Y lines 1Y1, 1Y2, 1Y3, 1Y4, with a memory element at each Y,W intersection of the group, e.g., memory elements 1Y1W1, 1Y1W2, 1Y1W3, etc. Further, there are as many bits in a word along a W line as there are groups, e.g., a first word 1W1 is made up of bits 1Y1W1, 2Y1W1, 3Y1W1, 4Y1W1, while the fourth word 4W1 is made up of bits 1Y4W1, 2Y4W1, 3Y4W1, 4Y4W1. Thus, each W line is coupled to four words (as many Y lines in a group), each of four-bits in length (as many groups in the system). All like-ordered Y lines, one from each group, are functionally arranged in a block for read, write operations. Thus, Y lines 1Y1, 2Y1, 3Y1, 4Y1 are functionally arranged in a first block while Y lines 1Y4, 2Y4, 3Y4, 4Y4 are functionally arranged in a fourth block. These above described arrangements are well known in prior art configurations. The present invention, inter alia, adds a temporary storage YT line to each group of the above-described configuration with a temporary storage element at each temporary storage YT line, W line intersection, e.g., temporary storage line 1YT of Group 1 couples the intersecting W lines W1-W12 by corresponding temporary storage elements 1YTW1—1YW12. Operation of the illustrated system shall be discussed in detail below with respect to FIGS. 2, 3 and 4.

Figure 2:
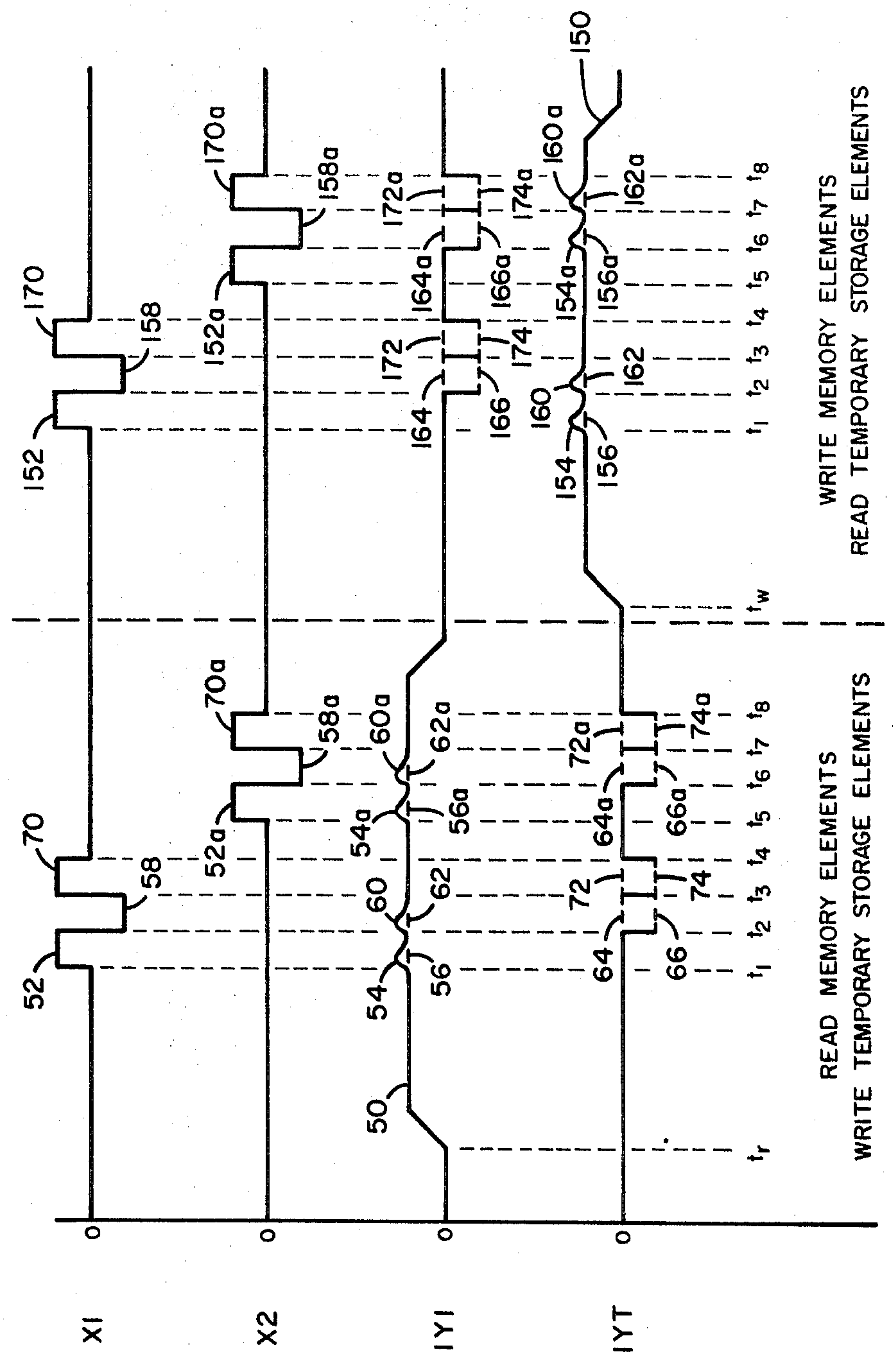
FIG. 2 is an illustration of the timing diagram of the signals associated with the consecutive read, consecutive write operation of four memory elements of FIG. 1 along a single Y line, double X line intersection.

With particular reference to FIG. 2 there is presented an illustration of the timing diagram of the signals associated with the consecutive read, consecutive write operation of four memory elements 1Y1W1, 1Y1W2, 1Y1W3, 1Y1W4 of FIG. 1 along the Y line 1Y1, X lines X1, X2 intersections. With reference back to FIG. 1, it can be seen that the memory system is comprised of four two-dimensional groups G1, G2, G3, G4 each group having the respectively associated Y lines Y1, Y2, Y3, Y4 and a temporary storage $t$ line. Passing orthogonally up and back through the four groups are X lines X1, X2, X3, X4, X5, X6 each of which X lines has two parallel half portions, e.g., X line X1 has portions W1, W2, along which are oriented four words of four bits in length.

Memory system 10 is operatively controlled by decoder-controller 12, which, in turn, controls bit selector 16 to couple a read current to the like-oriented Y lines of the four groups, e.g., Y lines 1Y1, 2Y1, 3Y1, 4Y1 of the associated Groups G1, G2, G3, G4. Subsequently, and coincident with the coupling of the read current signal to the selected Y lines, controller 12 causes word selector 14 to couple a bipolar current signal to a selected X line, e.g., X line X1 comprising word lines W1, W2. The bipolar pulses on the selected X line, due to the opposing winding sense of the two associated word lines at the selected Y lines, cause successive readout of the information of the memory elements at the fully selected X,Y intersections, e.g., memory elements 1Y1W1, 1Y1W2, which output signals are coupled out to the selected Y line through bit selector 16 and out the output lines 18, 19, 20, 21 associated with the like-ordered Y line of the associated group. As an example, the coincident selection of X line X1 and Y lines 1Y1 of Group 1, 2Y1 of Group 2, 3Y1 of Group 3, and 4Y1 of Group 4 causes two successive output signals, of significant amplitude for the readout of a "1" and of insignificant amplitude for the readout of a "0," to be emitted on the associated output lines 18, 19, 20, 21 indicative of the information read out of memory elements 1Y1W1, 1Y1W2 and 2Y1W1, 2Y1W2 and 3Y1W1, 3Y1W2, and 4Y1W1, 4Y1W2 respectively.

As readout of the information stored in memory system 10 is to be accomplished in one dimension of the two-dimensional memory system 10 formed by Groups G1, G2, G3, G4, i.e., along the Y line in the illustrated two-wire selection scheme of FIG. 1, the Y line read current is applied earlier in time than the X line read current. As the selected memory element, i.e., the memory element at the intersection of the selected X,Y lines, will not switch for a half select current (the Y current only), all noise pulses generated in the selected Y line by the turning on of the Y current must be permitted to subside before the X line read current is turned on. When the X line read current signal is coupled to the selected X line the fully selected memory element changes state, inducing a corresponding signal in the selected Y line which corresponding signal is representative of the informational state of the fully selected memory element. By properly timing the coupling of the Y read current and of the X read current to the selected Y line and X line there are induced in the selected Y line signals whose amplitudes are representative of a stored "1" or of a stored "0"; these signals provide a detectable difference signal between such two informational states. The output signal that is induced in the selected Y line is then reflected back into the selected Y line electronics in bit selector 16 to which is coupled the appropriate sense electronics capable of distinguishing between the readout of a stored "1" and of a stored "0." The associated sense amplifier is then strobed at a predetermined time after initiation of the X line current signal to provide an optimum difference signal. Such a readout system is more fully discussed in the hereinabove referenced copending patent application of R. H. Moberg.

Figure 3:
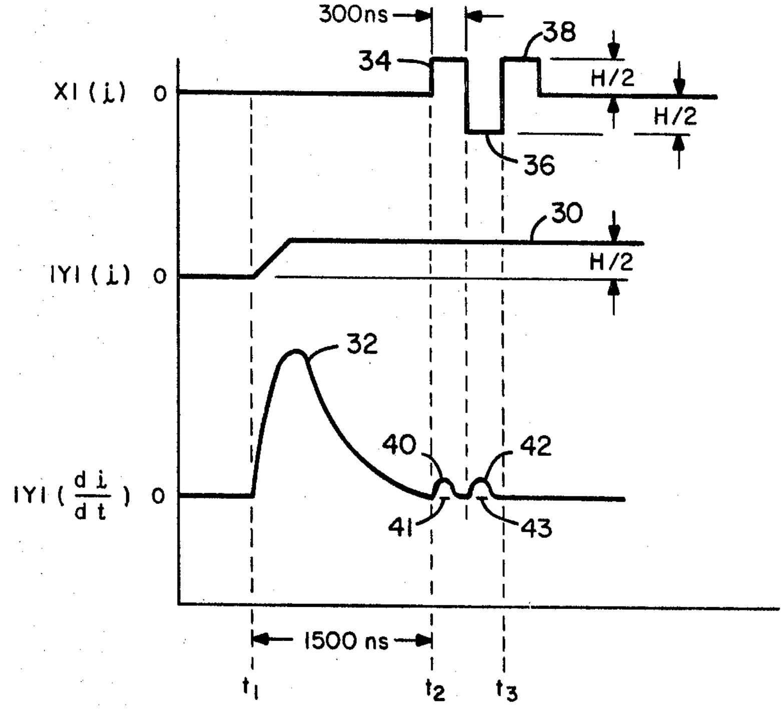
FIG. 3 is an illustration of the timing diagram of the signals associated with the operation of two memory elements of FIG. 1.

With particular reference to FIG. 3 there is presented an illustration of the timing diagram of the signals associated with the read operation of two memory elements of memory system 10 of FIG. 1. FIG. 3 illustrates the timing diagram of the signals associated with a memory system 10 that incorporates as the memory elements toroidal ferrite cores of 0.23 inch OD, 0.15 inch ID having a nominal switching time $T_s$ of 250 nanoseconds (ns).

Using memory elements 1Y1W1, 1Y1W2 at the intersection of Y line 1Y1 and X line X1 for illustrative purposes, at a time $t_1$ bit selector 16 couples a current signal 30 of one-half magnetizing force to Y line 1Y1. The coupling of current signal 30 to Y line 1Y1 induces in Y line 1Y1 a noise signal 32 of substantial amplitude sufficient to swamp out any output signal that may be induced in Y line 1Y1 by the full selection, i.e., known switching, of memory element 1Y1W1 or 1Y1W2 by the coincident coupling of a current read signal 34 or 36 to X line X1. Thus, it is prior art practice and it is so recognized by the present invention that a sufficient period of time, often termed the noise decay time, must be allowed to pass before a read current signal of one-half magnetizing force intensity may be coupled to the selected X line X1 to permit a meaningful readout of the informational content of the fully selected memory elements on the selected Y line Y1. After a sufficient noise decay period, 1500 ns in the embodiment using the presently discussed memory elements, at a time $t_2$ bit selector 16 is caused to couple the bipolar pulses 34, 36, each of 300 ns in duration and of one-half magnetizing force, causing the fully selected memory elements 1Y1W1, 1Y1W2 to induce in Y line 1Y1 significant signals 40, 42 indicative of the readout of a stored "1" or, alternatively, insignificant signals 41, 43 indicative of the readout of a stored "0."

As this noise decay period, $t_1$—$t_2$, is a fixed characteristic of the two-wire selection system of memory system 10 of FIG. 1, it is apparent that the actual readout time required is in the order of 20 percent of the noise decay period causing the memory read cycle, $t_1$—$t_3$, to be substantially comprised of the noise decay period. Thus, it is highly desirable that a means be provided whereby the effect of the noise decay period be minimized. The present invention achieves the minimization of the noise decay period by providing a means whereby a plurality of consecutive read cycles may be performed, e.g., readout of all the memory elements along a Y drive line, for each coupling of the read current to the Y line. This improved operation is achieved by the addition to FIG. 1 of a temporary storage YT line to each group of Y lines with a temporary storage element at each temporary storage YT line, W line intersection, e.g., temporary storage line 1YT of Group 1 couples the intersecting W lines W1—W12 by temporary storage elements 1YTW1—1YTW12.

MEMORY OPERATION

With particular reference back to FIG. 2 there will now be presented a discussion of the consecutive read, consecutive write operation of four memory elements 1Y1W1, 1Y1W2, 1Y1W3, 1Y1W4 of FIG. 1 along the Y line 1Y1, X lines X1, X2 intersections of Group 1. As each bit of the 4-bit words along the associated word lines W1, W2, W3, W4 is in an associated group, i.e., bit 1 is in Group 1, bit 2 is in Group 2, bit 3 is in Group 3, bit 4 is in Group 4, with each bit of the word along a like-ordered Y line of each group, i.e., bit 1 of word 1W1 is on Y line 1Y1, bit 2 is on Y line 2Y1, bit 3 is on Y line 3Y1, bit 4 is on Y line 4Y1, it is apparent that the 4 associated Y lines, i.e., Y lines 1Y1, 2Y1, 3Y1, 4Y1, must be operated simultaneously by bit selector 16 to provide the simultaneous readout along output lines 18, 29, 20, 21. FIG. 2 is directed toward the consecutive read, consecutive write operation of four memory elements along a single Y line; however, it is to be understood that the timing diagram of the signals associated with Y lines 2Y1, 3Y1, 4Y1 would be similar to that of the illustrated timing diagram of the signals associated with Y line 1Y1.

As previously discussed in detail with particular reference to FIG. 3 it is to be noted that the consecutive read, consecutive write operations are initiated by the coupling of a read current signal to the associated Y line, 1Y1, 1YT, respectively, at times $t_r$, $t_w$, respectively, followed by a substantial noise decay period, e.g., of 1500 ns in duration. After the passing of the noise decay period the appropriate read, write current signals are consecutively coupled to the consecutively ordered X lines, X1, X2, to achieve a desired read/write operation. This consecutive coupling of the read/write current signals to the consecutively ordered X lines X1, X2 permits the consecutive readout of all the words associated with a block of words, e.g., the words associated with the Y lines 1Y1, 2Y1, 3Y1, 4Y1, intersections with the X lines X1, X2, X3, X4, X5, X6. Thus, by utilizing the present invention all the words comprising a block of words may be consecutively read out of memory system 10 over a shortened read/write operation time duration by requiring only one noise decay period to pass prior to the consecutive readout of all the words of the block. Thus, the overall transfer time required to transfer a block of data, i.e., all the words within a given block, from memory system 10 to an external utilization device is substantially reduced. This improved operation of a two-wire memory system is, as discussed above, achieved by the incorporation of a single temporary storage Y line YT in each group of memory system 10, e.g., 1YT line in Group 1, 2YT line in Group 2, 3YT line in Group 3, 4YT line in Group 4. The read operation essentially consists of reading the information out of the fully selected memory element, e.g., 1Y1W1, and then writing such information into the correspondingly associated temporary storage element, e.g., 1YTW1. The write operation then substantially consists of the reverse operation, that is, reading the information out of the fully selected temporary storage element, e.g., 1YTW1, and then restoring that information back into the respectively associated memory element, e.g., 1Y1W1. Operation of consecutive read/write operations, but in a single memory element arrangement, is disclosed in the S. A. Brekne, U.S. Pat. No. 3,274,570.

READ OPERATION

Sequencing of a read operation using the timing diagram of FIG. 2 as associated with memory elements 1Y1W1, 1Y1W2, 1Y1W3, 1Y1W4 of Y line 1Y1 and with temporary storage elements 1YTW1, 1YTW2, 1YTW3, 1YTW4 of YT line 1YT at the intersections with word lines W1, W2, W3, W4 is as follows:

1. Bit selector 16 at time $t_r$ couples read current signal 50 to Y line 1Y1.

2. Word selector 14 at time $t_1$ couples a first polarity pulse 52 to X line X1, which coincident signals 52, 50 at the intersecting lines 1Y1, W1 (due to the additive polarity at memory element 1Y1W1 and the subtractive polarity at memory element 1Y1W2) cause memory element 1Y1W1 to change its binary state, i.e., switch its magnetic state from a first magnetic polarization to a second and opposite magnetic polarization, inducing in Y line 1Y1 a significant readout signal 54 indicative of the readout of a stored "1," or, alternatively, an insignificant readout signal 56 indicative of the readout of a stored "0." The readout signal 54 or 56 is reflected back into bit selector 16 which emits on its output line 18 an appropriate output signal, and, concurrently, generates an appropriately delayed restore signal 64 or 66 for the subsequent writing at time $t_2$ of a "1" or of a "0" in temporary storage element 1YTW1 which temporary storage element is located at the intersection of the temporary storage line 1YT and the associated word line W1.

3. Word selector 14 at time $t_2$ couples a second polarity pulse 58 to X line X1, which coincident signals 58, 50 at the intersecting lines 1Y1, W2 (due to the subtractive polarity at memory element 1Y1W1 and the additive polarity at memory element 1Y1W2) cause memory element 1Y1W2 to change its binary state inducing in Y line 1Y1 a significant readout signal 60 indicative of the readout of a stored "1," or, alternatively, an insignificant readout signal 62 indicative of the readout of a stored "0." The readout signal 60 or 62 is reflected back into bit selector 16 which emits on its output line 18 an appropriate output signal and concurrently generates an appropriately delayed restore signal 72 or 74 for the subsequent writing at time $t_3$ of a "1" or of a "0," respectively, in temporary storage element 1YTW2 which is at the intersection of the temporary storage line 1Y1 and the associated line W2. Additionally, the appropriately delayed restore signal 64 or 66 generated by bit selector 16 upon the readout of memory element 1Y1W1 (restore signal 64 for the writing of a "1" or restore signal 66 for the writing of a "0") coincident with pulse 58 on X line X1 sets temporary storage element 1YTW1 into the appropriate "1" or "0" state corresponding to the readout signal 54 or 56 generated upon the readout of memory element 1Y1W1 at time $t_1$.

4. Word selector 14 at time $t_3$ couples a first polarity pulse 70 to X line X1. Coincident signals 70 and the appropriately delayed restore signal 72 or 74 generated by bit selector 16 upon the readout of memory element 1Y1W2 (restore signal 72 for the writing of a "1" or restore signal 74 for the writing of a "0") set temporary storage element 1YTW2 into the appropriate "1" or "0" state corresponding to the readout signals 60 or 62 generated upon the readout of memory element 1Y1W2 at time $t_2$.

5. Steps 2, 3 and 4 above are repeated with word selector 14 coupling the signals 52*a*, 58*a*, 70*a* at times $t_5$, $t_6$, $t_7$, respectively, corresponding to signals 52, 58, 70 at times $t_1$, $t_2$, $t_3$, respectively, to line X2 instead of previously selected X line X1. The corresponding output signals 54*a* or 56*a* at time $t_5$ and 60*a* or 62*a* at time $t_6$ cause bit generator 16 to generate and to couple to temporary storage line 1YT the respectively appropriately delayed restore signal 64*a* or 66*a* at time $t_6$ and 72*a* or 74*a* at time $t_7$ whereupon temporary storage element 1YTW3 and 1YTW4, respectively, are set into the appropriate "1" or " 0" state corresponding to the readout signals generated upon the readout of memory element 1Y1W3 and 1Y1W4 at times $t_5$ and $t_6$, respectively.

6. Bit selector 16 at time $t_9$ decouples read current signal 50 from Y line 1Y1.

7. After the completion of Steps 1—6 above the information stored in memory elements 1Y1W1, 1Y1W2, 1Y1W3, 1Y1W4 has been read out at times $t_1$, $t_2$, $t_5$, $t_6$, respectively, providing the appropriate serialized output signals on output line 18 and at times $t_2$, $t_3$, $t_6$, $t_7$ setting temporary storage elements 1YTW1, 1YTW2, 1YTW3, 1YTW4, respectively, into the information states corresponding to the previous readout of memory elements 1Y1W1, 1Y1W2, 1Y1W3, 1Y1W4, respectively. Thus, Steps 1 —6 above have read the information out of the memory elements and have written the corresponding information into the corresponding temporary storage elements.

WRITE OPERATION

Sequencing of a write operation using the timing diagram of FIG. 2 is essentially the reverse process of the above discussed read operation wherein the information that was previously read out of memory elements 1Y1W1, 1Y1W2, 1Y1W3, 1Y1W4 and stored in the corresponding temporary storage elements 1YTW1, 1YTW2, 1YTW3, 1YTW4, respectively, is now to be read out of such temporary storage elements and $t_w$ written back into the corresponding memory elements. The write operation is as follows:

1. Bit selector 16 at time $t_w$ couples write current signal 150 to YT line 1YT.

2. Word selector 14 at time $t_1$ couples a first polarity pulse 152 to X line X1, which coincident pulses 152, 150 at the intersecting lines 1YT, W1 (due to the additive polarity at temporary storage element 1YTW1 and the subtractive polarity at temporary storage element 1YTW2) cause temporary storage element 1YTW1 to change its binary state, inducing in YT line 1YT a significant readout signal 154 indicative of the readout of a stored "1," or alternatively, an insignificant readout signal 156 indicative of the readout of a stored "0." The readout signal 154 or 156 is reflected back into bit selector 16 which generates an appropriately delayed restore signal 164 or 166 for the subsequent writing at time $t_2$ of a "1" or of a "0" in memory element 1Y1W1 which memory element is at the intersection of the Y line 1Y1 and the associated word line W1. 3. Word selector 14 at time $t_2$ couples a second polarity pulse 158 to X line X1, which coincident signals 158, 150 at the intersecting lines 1YTW2 (due to the subtractive polarity at temporary storage element 1YTW1 and the additive polarity at temporary storage element 1YTW2) cause temporary storage element 1YTW2 to change its binary state inducing in YT line 1YT a significant readout signal 160 indicative of the readout of a stored "1," or, alternatively, an insignificant readout signal 162 indicative of the readout of a stored "0." The readout signal 160 or 162 is reflected back into bit selector 16 which generates an appropriately delayed restore signal 172 or 174 for the subsequent writing at time $t_3$ of a "1" or of a "0," respectively in memory element 1Y1W2 which memory element is at the intersection of the Y line 1Y1 and the associated word line W2. Additionally, the appropriately delayed restore signal 164 or 166 generated by bit selector 16 upon the readout of memory element 1YTW1 (restore signal 164 for writing of a "1" or restore signal 166 for the writing of a "0") coincident with pulse 158 on X line X1 sets memory element 1Y1W1 into the appropriate "1" or "0" state corresponding to the readout signal 154 or 156 generated upon the readout of temporary storage element 1YTW1 at time $t_1$.

4. Word selector 14 at time $t_3$ couples a first polarity pulse 170 to X line X1. Coincident signals 170 and the appropriately delayed restore 172 or 174 generated by bit selector 16 upon the readout of temporary storage element 1YTW2 (restore signal 172 for the writing of a "1" or restore signal 174 for the writing of a "0") set memory element 1Y1W2 into the appropriate "1" or "0" state corresponding to the readout signals 160 or 162 generated upon the readout of temporary storage element 1Y1W2 at time $t_2$.

5. Steps 2, 3 and 4 above are repeated with word selector 14 coupling the signals **152*a*, 158*a*, 170*a* at times $t_5$, $t_6$, $t_7$ respectively, corresponding to signals 152, 158, 170 at times $t_1$, $t_2$, $t_3$, respectively, of the read operation to X line X2 instead of the previously selected X line X1. The corresponding output signals 154*a* or 156*a* at time $t_5$ and 160*a* or 162*a* at time $t_1$ cause bit generator 16 to generate and to couple to Y line 1Y1 the respectively appropriately delayed restore signals 164*a* or 166*a* and 172*a* or 174*a* at time $t_7$ whereupon memory element 1Y1W3 and 1Y1W4, respectively, are set into the appropriate "1" or "0" state corresponding to the readout signals generated upon the readout of temporary storage elements 1YTW3 and 1YTW4** at times $t_5$ and $t_6$ respectively.

6. Bit selector 16 at time $t_0$ decouples write current signal 150 from YT line 1YT.

7. After the completion of Steps 1—6 above the information stored in temporary storage elements 1YTW1, 1YTW2, 1YTW3, 1YTW4 has been read out at times $t_1$, $t_2$, $t_5$, $t_6$, respectively and at times $t_2$, $t_3$, $t_6$, $t_7$ has set memory elements 1Y1W1, 1Y1W2, 1Y1W3, 1Y1W4, respectively. Thus, Steps 1—6 above have read the information out of the temporary storage elements and have written the corresponding information back into the corresponding memory elements.

SYSTEM OPERATION

Figure 4:
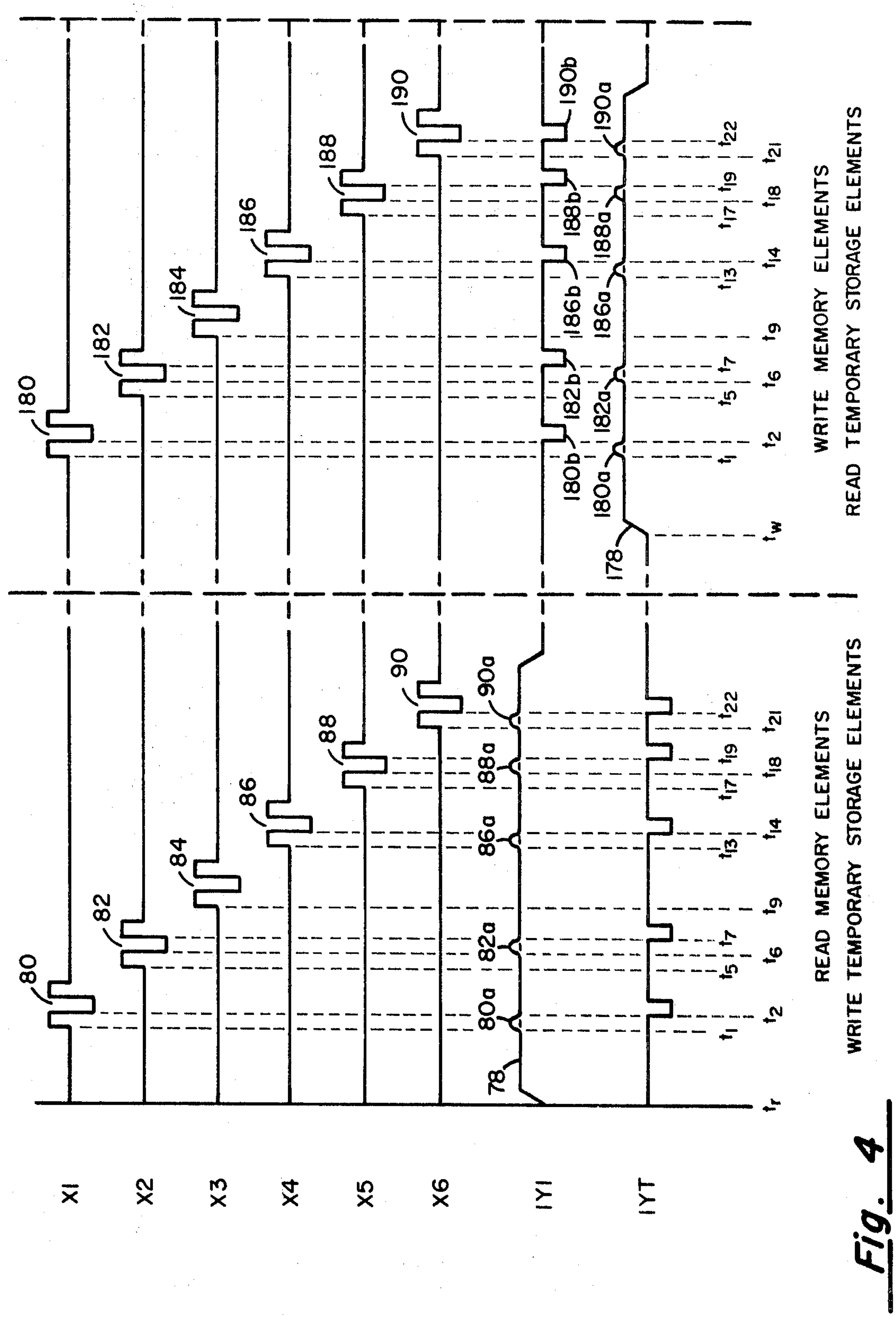
FIG. 4 is an illustration of the timing diagram of the signals associated with the consecutive read, consecutive write operation of a plurality of memory elements of FIG. 1 along a single Y line at a plurality of X line intersections.

With particular reference to FIG. 4 there is presented an illustration of the timing diagram of the signals associated with the consecutive read, consecutive write operation of a plurality of memory elements 1Y1W1—1Y1W12 which memory elements are aligned along the single Y line 1Y1 having a plurality of X line intersections. The timing diagram of FIG. 4 is recognized as a mere extension of the timing diagram of FIG. 2 illustrating the signal relationships associated with an exemplary 12-bit block oriented along the Y line 1Y1, X line intersections of Group 1 of memory system 10 of FIG. 1. As previously discussed with particular reference to FIG. 2 it is to be appreciated that all like-ordered Y lines, e.g., Y lines 1Y1, 2Y1, 3Y1, 4Y1 of Groups 1, 2, 3, 4 which Y lines form Block 1, of memory system 10 would be simultaneously selected providing simultaneous output signals on output lines 18, 19, 20, 21 of bit selector 16. However, for purposes of simplifying the discussion of the present invention only the 12-bit block associated with Y line 1Y1 of Group 1 shall be discussed. For purposes of providing an exemplary discussion, the 12-bit block 100100100110, corresponding to the information states of memory elements 1Y1W1—1Y1W12 respectively, shall be assumed to have been previously written into such respectively associated memory elements. As in the previously discussed read operation, at time $t_4$ bit selector 16 couples the associated read current signal 78 to Y line 1Y1. Then, at the subsequent times $t_1$, $t_5$, $t_9$, $t_{13}$, $t_{17}$, $t_{20}$ word selector 14 couples the associated bipolar read current signals 80, 82, 84, 86, 88, 90 to the associated X lines X1, X2, X3, X4, X5, X6, respectively. With the above 12-bit block stored in memory elements 1Y1W1 —1Y1W12 there are induced in Y line 1Y1 the significant readout "1" signals **80*a*, 82*a*, 86*a*, 88*a*, 90*a* that are associated with the readout of the stored "1" in memory elements 1Y1W1, 1Y1W4, 1Y1W7, 1Y1W10, 1Y1W11 at times $t_1$, $t_6$, $t_{13}$, $t_{18}$, $t_{21}$. These readout signals 80*a*, 82*a*, 86*a*, 88*a*, 90*a*, through bit selector 16, generate the appropriately delayed restore signals 80*b*, 82*b*, 86*b*, 88*b*, 90*b*, respectively, for writing the information that was read out of such memory elements at times $t_1$, $t_6$, $t_{13}$, $t_{18}$, $t_{21}$ into the respectively associated temporary storage elements 1YTW1, 1YTW4, 1YTW7, 1YTW10, 1YTW11 at the respectively associated delay times $t_2$, $t_7$, $t_{14}$, $t_{19}$, $t_{22}$. After this read operation the 12-bit block 100100100110, that was initially stored in memory elements 1Y1W1—1Y1W12 has been readout providing the appropriately serialized readout signals 80*a*, 82*a*, 86*a*, 88*a*, 90*a* on output line 18 and has been written into temporary storage elements 1YTW1—1YTW12**.

As in the previously discussed write operation, at time $t_w$ bit selector 16 couples the associated write current signal 178 to YT line 1YT. Then, at the subsequent times $t_1$, $t_5$, $t_9$, $t_{13}$, $t_{17}$, $t_{20}$ word selector 14 couples the associated bipolar write current signals 180, 182, 184, 186, 188, 190 to the associated X lines X1, X2, X3, X4, X5, X6, respectively. With the above 12-bit block stored in temporary storage elements 1YTW1—1YTW12 there are induced in YT line 1YT the significant readout "1" signals **180*a*, 182*a*, 186*a*, 190*a* that are associated with the readout of the stored "1" in temporary storage elements 1YTW1, 1YTW4, 1YTW7, 1YTW10, 1YTW11 at times $t_1$, $t_6$, $t_{13}$, $t_{18}$, $t_{20}$. These readout signals 180*a*, 182*a*, 186*a*, 188*a*, 190*a*, through bit selector 16, generate the appropriately delayed restore signals 180*b*, 182*b*, 186*b*, 188*b*, 190*b*, respectively, for writing the information that was read out of such memory elements at times $t_1$, $t_6$, $t_{13}$, $t_{18}$, $t_{21}$ into the respectively associated memory elements 1Y1W1, 1Y1W4, 1Y1W7, 1Y1W10, 1Y1W11 at the delay times $t_2$, $t_7$, $t_{14}$, $t_{19}$, $t_{22}$. After this write operation the 12-bit block 100100100110 that was initially stored in memory elements 1Y1W1—1Y1W12 and which was temporarily written into temporary storage elements 1YTW1—1YTW12 during the previously discussed read operation has been restored into memory elements 1Y1W1—1Y1W12**.

Figure 5:
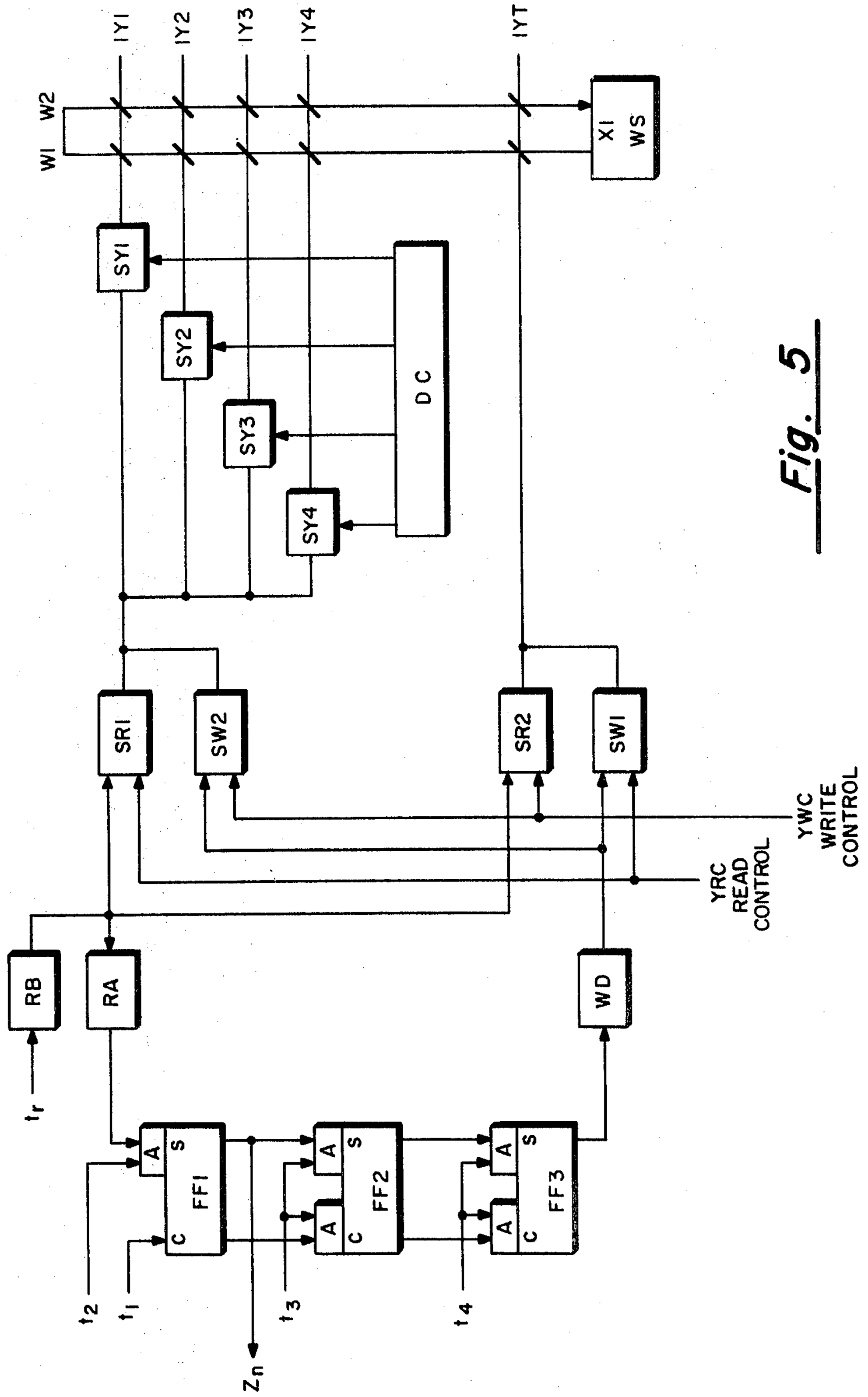
FIG. 5 is an illustration of a block diagram of the Y dimension selection system that may be encompassed within the bit selector of FIG. 1.
Figure 6A:
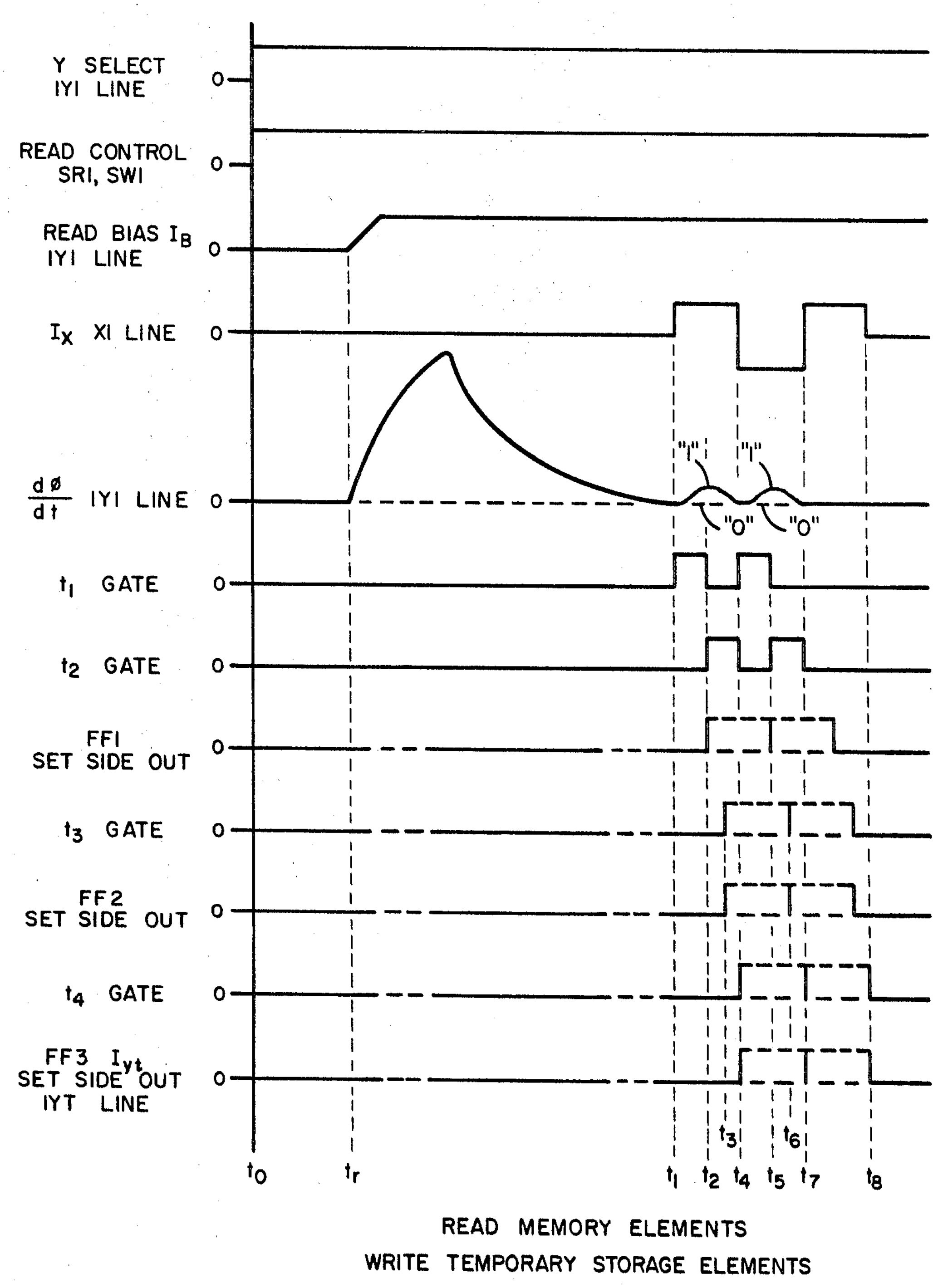
FIGS. 6*a*, 6*b* are illustrations of the timing diagrams of the signals associated with the block diagram of FIG. 5.
Figure 6B:
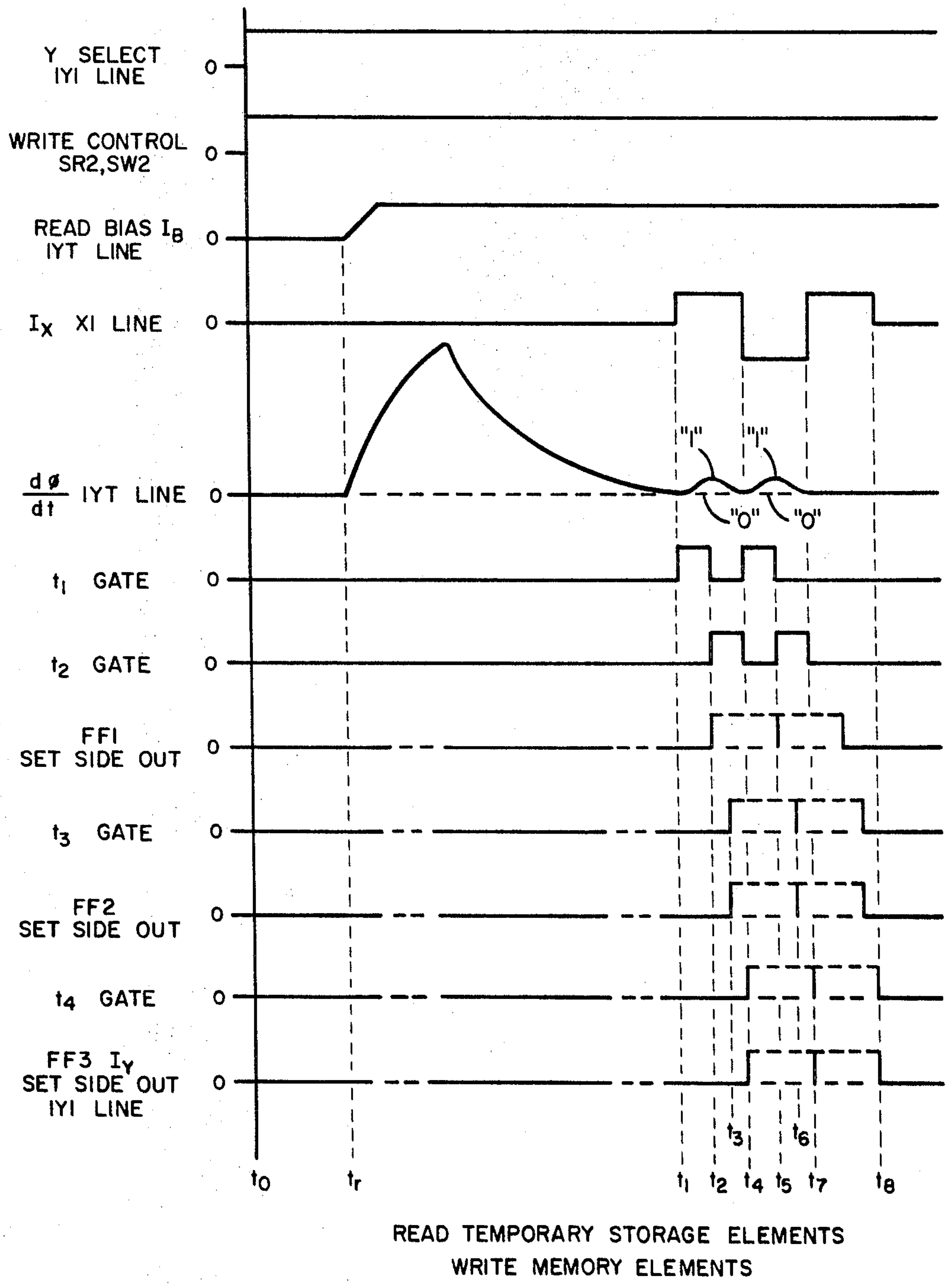

With particular reference to FIGS. 5, 6a 6b there are presented illustrations of a block diagram and of the associated timing diagram of a Y dimension selection system that may be incorporated in bit selector 16 of memory system 10 of FIG. 1. Only one group, Group G1, is illustrated; however, selection of the other groups would be similar.

Operation of the embodiments of FIGS. 5, 6a 6b is similar to that of the discussion of FIGS. 1—4; however, a brief summary of such operation is as follows.

READ SEQUENCE

This operation consists of reading out the information stored in the memory elements, e.g., 1Y1W1, 1Y1W2, and writing such information into the associated temporary storage elements, e.g., 1YTW1, 1YTW2.

1. At time $t_0$ decoder-controller DC activates one of the Y line switches SY1, SY2, SY3, SY4, e.g., SY1 selecting Y line 1Y1; Y read control line YRC activates read switch SR1 coupling the selected Y line 1Y1 to the read bias source RB and to the read amplifier RA; Y read control line YRC also activates write switch SW1 coupling YT line 1YT to the write driver WD.

2. At time $t_r$ the read bias source RB is activated coupling the half amplitude read bias current $I_B$ to the selected Y line 1Y1.

3. At time $t_1$ the word selector WS is activated coupling the positive polarity half amplitude read current $+I_x$ to the selected X line X1 (W1, W2). The half amplitude read currents $I_B$ and $+I_x$ combine at memory element 1Y1W1 to read out its information state inducing an appropriate output signal $d\Phi/dt$ in the selected Y line 1Y1. Additionally, the $t_1$ gate is coupled to the clear input of FF1 clearing FF1 prior to the generation of the output signal in Y line 1Y1.

4. At time $t_2$ the $t_2$ gate is coupled to the set input of FF1 whereby the output of the read amplifier RA is gated into the set input of FF1; if a "1" has been read out of memory element 1Y1W1, FF1 is set, otherwise FF1 remains clear.

5. At time $t_3$ the $t_3$ gate is coupled to the inputs of FF2 transferring the contents of FF1 to FF2 before the next $t_1$ gate clears FF1.

6. At time $t_4$ the $t_4$ gate is coupled to the inputs of FF3 transferring the contents of FF2 to FF3. The set output of FF3 controls write driver WD; if FF3 is set by a "1" output from memory element 1Y1W1, a half amplitude current signal $I_{YT}$ is coupled to YT line 1YT; otherwise no current signal is coupled to YT line 1YT. The half amplitude current signals $-I_x$, furnished by word selector WS, and $I_{YT}$ combine at temporary storage element 1YTW1 to write a "1" therein. The half amplitude current signals $I_B$ and $-I_x$ combine at memory element 1Y1W2 to read out its information state inducing an appropriate output signal $d\Phi/dt$ in Y line 1Y1. Additionally, the $t_1$ gate is again coupled to the clear input of FF1 clearing FF1 prior to the generation of the output signal in Y line 1Y1.

7. At time $t_5$ the $t_2$ gate is again coupled to the set input of FF1 whereby the output of the read amplifier RA is gated into the set input of FF1; if a "1" has been read out of memory element 1Y1W2, FF1 is set, otherwise FF1 remains clear.

8. At time $t_6$ the $t_3$ gate is again coupled to the inputs of FF2 transferring the contents of FF1 to FF2 before the next $t_1$ gate clears FF1.

9. At time $t_7$ the $t_4$ gate is again coupled to the inputs of FF3 transferring the contents of FF2 to FF3. The set output of FF3 controls write driver WD; if FFS is set by a "1" output from memory element 1Y1W2, a half amplitude current signal $I_{YT}$ is coupled to YT line 1YT; otherwise no current signal is coupled to YT line 1YT. The half amplitude current signals $+I_x$, furnished by word selector WS, and $I_{YT}$ combine at temporary storage element 1YTW2 to write a "1" therein.

WRITE SEQUENCE

This operation consists of reading out the information stored in the temporary storage elements, e.g., 1YTW1, 1YTW2, and writing such information back into the associated memory elements, e.g., 1Y1W1, 1Y1W2.

1. At time $t_0$ decoder-controller DC activates one of the Y line switches SY1, SY2, SY3, SY4, e.g., SY1 selecting Y line 1Y1; Y write control line YWC activates read switch SR2 coupling the selected YT line 1YT to the read bias source RB and to the read amplifier RA; Y write control line YWC also activates write switch WR2 coupling Y line 1Y1 to the write driver WD.

2. At time $t_r$ the read bias source RB is activated coupling the half amplitude read bias current $I_B$ to the selected YT line 1YT.

3. At time $t_1$ the word selector WS is activated coupling the positive polarity half amplitude read current $+I_x$ to the selected X line X1 (W1, W2). The half amplitude read currents $I_B$ and $+I_x$ combine at memory element 1YTW1 to read out its information state inducing an appropriate output signal $d\Phi/dt$ in the selected YT line 1YT. Additionally, the $t_1$ gate is coupled to the clear input of FF1 clearing FF1 prior to the generation of the output signal in YT line 1YT.

4. At time $t_2$ the $t_2$ gate is coupled to the set input of FF1 whereby the output of the read amplifier RA is gated into the set input of FF1; if a "1" has been read out of memory element 1YTW1, FF1 is set, otherwise FF1 remains clear.

5. At time $t_3$ the $t_3$ gate is coupled to the inputs of FF2 transferring the contents of FF1 to FF2 before the next $t_1$ gate clears FF1.

6. At time $t_4$ the $t_4$ gate is coupled to the inputs of FF3 transferring the contents of FF2 to FF3. The set output of FF3 controls write driver WD; if FF3 is set by a "1" output from memory element 1YTW1, a half amplitude current signal $I_Y$ is coupled to Y line 1Y1; otherwise no current signal is coupled to Y line 1Y1. The half amplitude current signals $-I_x$, furnished by word selector WS, and $I_Y$ combine at memory element 1Y1W1 to write a "1" therein. The half amplitude currents $I_B$ and $-I_x$ combine at temporary storage element 1YTW2 to read out its information state inducing an appropriate output signal $d\Phi/dt$ in $t$ line 1YT. Additionally, the $t_1$ gate is again coupled to the clear input of FF1 clearing FF1 prior to the generation of the output signal in $t$ line 1YT.

7. At time $t_5$ the $t_2$ gate is again coupled to the set input of FF1 whereby the output of the read amplifier RA is gated into the set input of FF1; if a "1" has been read out of temporary storage element 1YTW2, FF1 is set, otherwise FF1 remains clear.

8. At time $t_6$ the $t_3$ gate is again coupled to the inputs of FF2 transferring the contents of FF1 to FF2 before the next $t_1$ gate clears FF1.

9. At time $t_7$ the $t_4$ gate is again coupled to the inputs of FF3 transferring the contents of FF2 to FF3. The set output of FF3 controls write drive WD; if FF3 is set by a "1" output from temporary storage element 1YTW2, a half amplitude current signal $I_Y$ is coupled to Y line 1Y1; otherwise no current signal is coupled to Y line 1Y1. The half amplitude current signals $+I_x$ furnished by word selector WS, and $I_Y$ combine at memory element 1Y1W2 to write a "1" therein.

Figure 7:
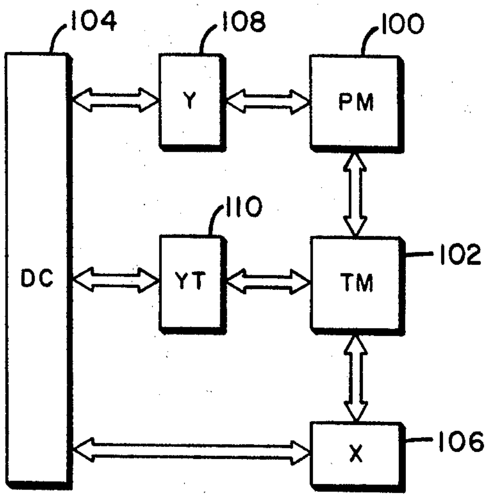
FIG. 7 is an illustration of a second embodiment of the present invention.

With particular reference to FIG. 7 there is presented an illustration of a second embodiment of a memory system incorporating the present invention. In this embodiment the memory elements are physically separated from the temporary storage elements as in two separate modular components identified as the permanent memory modular components identified as the permanent memory module 100 and the temporary memory module 102, respectively. Addressing of the desired block of words, or of a plurality of desired words within a desired block, is, as in the illustrated embodiment of FIG. 1, under the control of a decoder-controller 104. Decoder-controller 104 selects the desired X, Y line intersections within permanent memory module 100 and the corresponding X, YT line intersections within temporary memory module 102. As in such previous described operation: word selector 106 selects the desired X line, and, accordingly, the two associated word lines; bit selector 108 selects the desired like-ordered Y lines of the several groups of Y lines in permanent memory module 100; while a separate temporary storage bit selector 110 selects the temporary storage YT line of temporary storage module 102 that is associated with the group of Y lines of permanent memory module 100 that is selected by bit selector 108. Information is read out of bit selector 108 or bit selector 110 and is emitted therefrom in a bit parallel, word serial manner as in FIG. 1, e.g., in a 12 word, 4-bits per word permanent memory module 100 the 4-bits of each word would be emitted in parallel with each 4-bit words of the selected group emitted serially.

Figure 8:
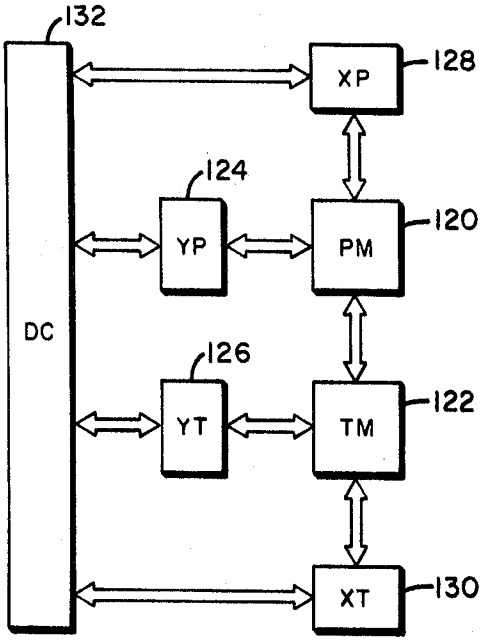
FIG. 8 is an illustration of a third embodiment of the present invention.

With particular reference to FIG. 8 there is presented an illustration of a third embodiment of a memory system incorporating the present invention. In this embodiment the permanent memory module 120 and the temporary memory module 122 each have separate associated bit selectors 124, 126 and word selectors 128, 130 under control of a decoder-controller 132. Additionally, in contrast to the previously described embodiments, where the permanent memory elements and the temporary storage elements are preferably similar devices operating at the same memory speeds, this arrangement preferably incorporates different operating speed devices in the two memory modules. As an example, the permanent memory elements may be destructive readout toroidal ferrite cores having switching times of $\mu$ microsecond (us) while the temporary storage elements may be nondestructive readout integrated circuits having an access time of 50 nanoseconds (ns). Using these different storage devices, the consecutive read, consecutive write operations transferring the plurality of multibit data words between the permanent and temporary memory modules would be, of a necessity, limited to the slower permanent memory module operating speed. However, using nondestructive readout temporary storage devices in the temporary memory module would permit using faster temporary memory module cycle speeds. Thus, blocks of data could be exchanged between the permanent and temporary memory modules at a first slower permanent memory module speed while individual multibit data words could be subsequently read out of the temporary memory module at its faster speed.

Figure 9:
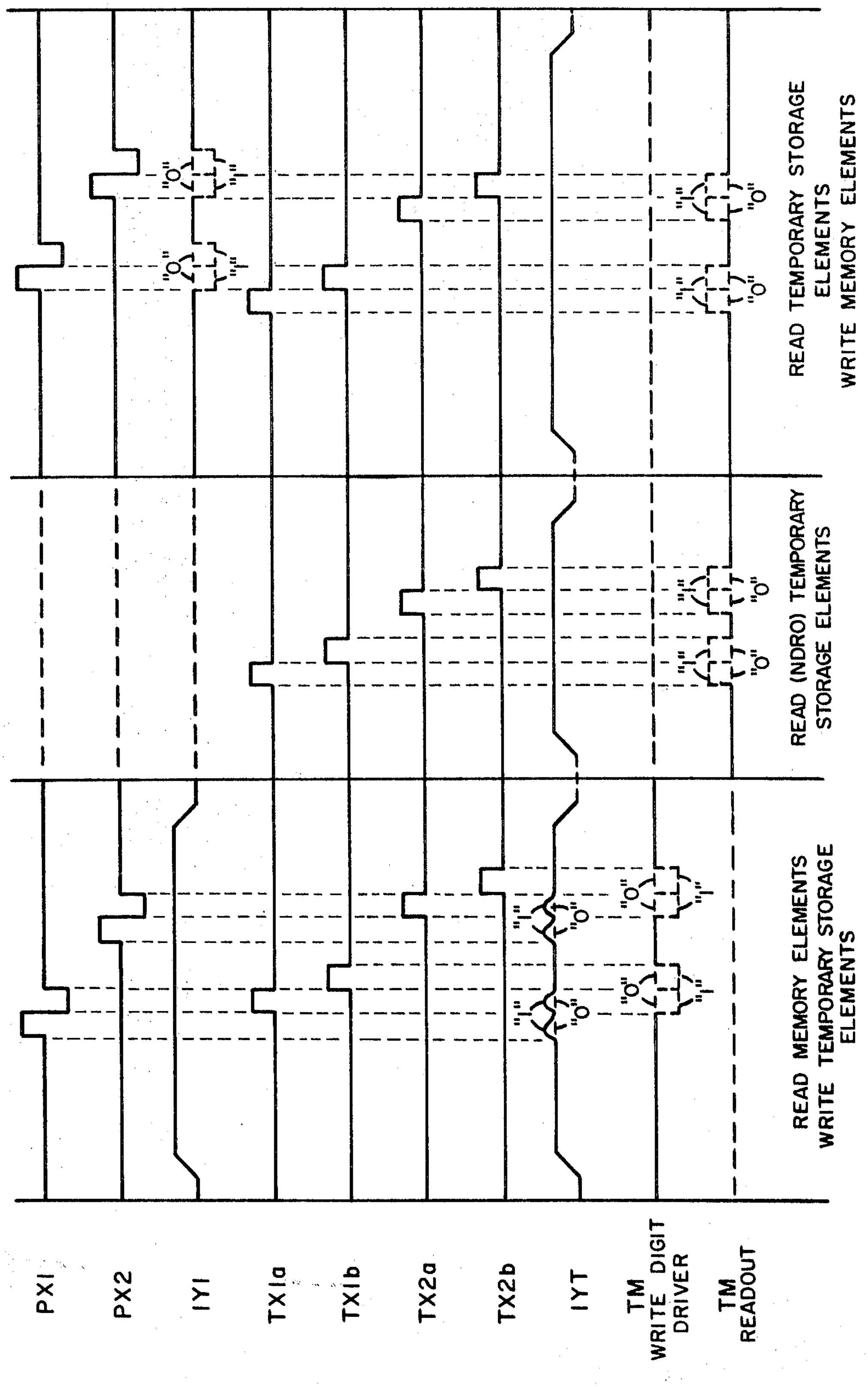
FIG. 9 is an illustration of the timing diagram of the signals associated with the embodiment of FIG. 8.

With particular reference to FIG. 9 there is presented an illustration of a timing diagram of the signals associated with the operation of the memory system of FIG. 8. In this arrangement the separate X lines PX1, PX2 of permanent memory module 120, are driven by bipolar pulses while the Y line 1Y1, of permanent memory module 120, is driven by signals similar to those of FIG. 2. The temporary memory is a conventional 3D organization with line TX1*a*, TX1*b*, TX2*a*, TX2*b* gated with 1YT to select words W1, W2, W3, ad W4, respectively. The operation of FIGS. 8, 9 is to read a block of information out of permanent memory module 120, store such information in temporary memory module 122, read such information out of temporary memory module 122, into the associated decoder-controller 132 and subsequently, if desired, write such information back into permanent memory module 120.

I claim:

1. A memory system, comprising:

a plurality of intersecting X and Y lines, each X line comprising first and second intercoupled W lines, with a memory element at each first and second W,Y intersection;

a YT line intersecting said first and second W lines with a temporary storage element at each first and second W,T intersection;

word selector means for concurrently selecting one of said X lines and one of said Y lines for consecutively reading out and detecting the information content of the selected memory elements at the first and second W,Y intersections; and, bit selector means concurrently selecting said one selected X line and said YT line for writing into the selected temporary storage elements at the selected first and second W,YT intersections as determined by the information content of the selected memory elements at the selected first and second W,Y intersections, respectively, and for restoring such information back into said selected memory elements from said selected temporary storage elements.

2. A memory system, comprising:

a plurality of groups of ordered Y lines;

a plurality of YT lines, a separate one associated with a separate one of said groups of Y lines;

a plurality of X lines each comprised of first and second parallel W lines forming W,Y intersections with said Y lines and W,YT intersections with said YT lines;

a plurality of memory elements, one at each W,Y intersection;

a plurality of temporary storage elements, one at each W,YT intersection;

word selector means for selecting consecutive ones of said X lines;

Bit selector means for concurrently selecting a like-ordered Y line of each of said groups of Y lines and the YT lines associated with each of said groups of Y lines;

controller means coupled to said word selector means and said bit selector means causing said bit selector means to concurrently select the like-ordered Y line of each of said groups of Y lines and the YT lines associated with each of said groups of Y lines for consecutively reading out the information content of the memory elements at the selected consecutive W,Y intersections and consecutively writing such information into the temporary storage elements at the selected corresponding W,YT intersections.

3. A memory system, comprising:

a plurality of intersecting X and Y lines, each X line comprised of first and second W lines with a memory element at each first and second W,Y intersection;

a YT line intersecting said first and second W lines with a temporary storage element at each first and second W,YT intersection;

bit selector means concurrently selecting one of said Y lines and said YT line for alternatively coupling a first polarity read signal thereto and detecting output signals therefrom or coupling delayed second polarity restore signals thereto;

word selector means selecting one of said X lines for coupling thereto a signal having alternate first, second, first polarities;

said word selector means first, first polarity signal and said bit selector means first polarity read signal selecting the first memory element at the first W,Y intersection for detecting the information content of the selected first memory element at said intersection and for providing on said selected Y line an associated, first output signal;

said first output signal causing said bit selector means to generate a delayed second polarity first restore signal indicative of the information content of the selected first memory element and to couple said delayed second polarity first restore signal to said YT line;

said word selector means second polarity signal and said bit selector means delayed second polarity first restore signal coincident in time at said first temporary storage element for setting said first temporary storage element at the selected first W,YT intersection into an information state determined by the information content of said selected first memory element;

said word selector means second polarity signal and said bit selector means first polarity read signal selecting said second memory element at the second W,Y intersection for detecting the information content of the selected second memory element at said intersection and for providing on said selected Y line an associated second output signal;

said second output signal causing said bit selector means to generate a delayed second polarity second restore signal indicative of the information content of said selected second memory element and to couple said delayed second polarity second restore signal to said YT line;

said word selector means second, first polarity signal and said bit selector means delayed second polarity restore signal coincident in time at said second temporary storage element for setting said second temporary storage element at the selected second W,YT intersection into an information state determined by the information content of said selected second memory element.

4. A memory system, comprising:

a permanent memory module including a plurality of groups of ordered Y lines;

a temporary memory module including a plurality of YT lines, a separate one associated with each of said groups of Y lines;

a plurality of X lines each comprised of first and second portions, a first portion forming X,Y intersections with said Y lines and a second portion forming X,YT intersections with said YT lines;

a plurality of memory elements, one at each X,Y intersection;

a plurality of temporary storage elements, one at each X,YT intersection;

word selector means for selecting consecutive ones of said X lines;

bit selector means for concurrently selecting the like-ordered Y line of each of said groups of Y lines and the YT lines that are associated with each of said groups of Y lines;

controller means coupled to said word selector means and said bit selector means causing said bit selector means to concurrently select the like-ordered Y line of all of said groups of Y lines and the YT lines that are associated with each of said groups of Y lines for consecutively reading out the information content of the memory element at a selected X,Y intersection and then writing such information into the temporary storage element at the selected corresponding X,YT intersection.

5. A memory system, comprising:

a permanent memory module;

a temporary memory module;

a plurality of X lines which are electrically common to said permanent memory module and to said temporary memory module, each of said X lines comprised of first and second parallel W lines;

word selector means for selecting one of said X lines;

said permanent memory module including a plurality of groups of ordered Y lines for forming a plurality of intersections with said X lines, a memory element at each X,Y intersection;

permanent bit selector means for concurrently selecting one of said Y lines of each group of Y lines;

said temporary memory module including a plurality of YT lines, one YT line associated with each of said groups of Y lines, for forming a plurality of intersections with said X lines, a temporary storage element at each X,YT intersection;

temporary bit selector means for selecting the YT lines associated with said selected Y lines;

controller means;

said controller means coupled to said permanent bit selector means, said temporary bit selector means and said word selector means for concurrently selecting one of said Y lines of each group of Y lines, the YT lines associated with said selected Y lines, and one of said X lines for reading out the information content of the memory elements at the selected X,Y intersections and writing such information into the temporary storage elements at the selected X,YT intersections and for subsequently restoring such information back into said memory elements from said temporary storage elements.

6. A memory system, comprising:

a permanent memory module;

a temporary memory module;

said permanent memory module including a plurality of groups of ordered Y lines, each group of a like-ordered plurality of Y lines, and further including a plurality of PX lines, each PX line comprising first and second PW lines, said PW and Y lines forming a plurality of PW,Y intersections with a memory element at each PW,Y intersection;

said temporary memory module including a plurality of YT lines, each YT line associated with a separate one of said groups of Y lines of said permanent memory module, and further including a plurality of TX lines, said TX and YT lines forming a plurality of TX,YT intersections with a temporary storage element at each TX,YT intersection;

permanent word selector means coupled to said permanent memory module for selectively energizing one of said PX lines;

temporary word selector means coupled to said temporary memory module for selectively energizing one of said TX lines;

permanent bit selector means coupled to said permanent memory module for selectively energizing the like-ordered Y line of each group of Y lines;

temporary bit selector means coupled to said temporary memory module for selectively energizing the YT lines that are associated with the like-ordered Y lines that are energized by said permanent bit selector means;

controller means coupled to said permanent word selector means, said permanent bit selector means, said temporary word selector means and said temporary bit selector means for selectively energizing one of said PX lines and the like-ordered Y line of each group of Y lines for reading out the information content of the memory elements at the selected PX,Y intersections and for selectively energizing one of said TX lines and the YT lines associated with the selected like-ordered Y lines for writing the information read out of the memory elements at the selected PX,Y intersections into the temporary storage elements at the selected TX,YT intersections.